(12) United States Patent
Bell et al.

(10) Patent No.: US 10,048,039 B1
(45) Date of Patent: Aug. 14, 2018

(54) SIGHTING AND LAUNCHING SYSTEM CONFIGURED WITH SMART MUNITIONS

(71) Applicants: John Curtis Bell, Honolulu, HI (US);
Curtis King Bell, Portland, OR (US);
David Rogers Bell, Santa Monica, CA (US)

(72) Inventors: John Curtis Bell, Honolulu, HI (US);
Curtis King Bell, Portland, OR (US);
David Rogers Bell, Santa Monica, CA (US)

( * ) Notice: Subject to any disclaimer, the term of this patent is extended or adjusted under 35 U.S.C. 154(b) by 0 days.

(21) Appl. No.: 15/077,712

(22) Filed: Mar. 22, 2016

Related U.S. Application Data

(63) Continuation-in-part of application No. 13/925,620, filed on Jun. 24, 2013, now Pat. No. 9,310,165, which is a continuation-in-part of application No. 12/607,822, filed on Oct. 28, 2009, now Pat. No. 8,468,930, which is a continuation-in-part of application No. 11/120,701, filed on May 3, 2005, now Pat. No. 7,624,528, which is a continuation-in-part of application No. 10/441,422, filed on May 19, 2003, now Pat. No. 6,886,287.

(60) Provisional application No. 60/381,922, filed on May 18, 2002.

(51) Int. Cl.
| | |
|---|---|
| *F42B 15/01* | (2006.01) |
| *F41G 9/00* | (2006.01) |
| *B64C 39/02* | (2006.01) |
| *G05D 1/00* | (2006.01) |

(52) U.S. Cl.
CPC ............ *F41G 9/002* (2013.01); *B64C 39/024* (2013.01); *F42B 15/01* (2013.01); *G05D 1/0022* (2013.01); *B64C 2201/121* (2013.01); *B64C 2201/128* (2013.01); *B64C 2201/141* (2013.01); *G05D 2201/0209* (2013.01)

(58) Field of Classification Search
CPC .......... F42B 15/01; F42B 15/04; F41H 11/02
USPC ....................................................... 89/1.11
See application file for complete search history.

(56) References Cited

U.S. PATENT DOCUMENTS

| | | | | |
|---|---|---|---|---|
| 4,267,562 A | * | 5/1981 | Raimondi | ................. F41G 3/02 348/144 |
| 6,474,592 B1 | * | 11/2002 | Shnaps | ................. F42B 12/365 102/211 |

(Continued)

FOREIGN PATENT DOCUMENTS

EP 2851647 * 3/2015

*Primary Examiner* — Stephen Johnson
(74) *Attorney, Agent, or Firm* — Knobbe, Martens, Olson & Bear, LLP

(57) ABSTRACT

A sighting and launching weapons system that incorporates the technologies of smart munitions and virtual reality (VR) simulation with precise target engagement capabilities; including targets that would normally be hidden from the shooter's field of view. Non-linear deployment of smart munitions to a precise target coordinate (via closed-loop navigation) allows for minimal collateral damage. Network link allows a plurality of operators to participate in coordinated target engagement in real time from one or more remote locations. The sighting and launching weapons system can be configured for a variety of uses including the deployment of weaponry or aid, and is capable of automatically identifying friendly targets from enemy targets.

15 Claims, 8 Drawing Sheets

(56) References Cited

U.S. PATENT DOCUMENTS

| | | | | |
|---|---|---|---|---|
| 6,845,714 B1* | 1/2005 | Smith | ............... | F42C 15/295 |
| | | | | 102/208 |
| 7,533,849 B2* | 5/2009 | Zemany | ............... | F41G 7/222 |
| | | | | 102/382 |
| 8,439,301 B1* | 5/2013 | Lussier | ............... | B64F 1/02 |
| | | | | 244/63 |
| 8,543,255 B2* | 9/2013 | Wood | ............... | G05D 1/0027 |
| | | | | 701/2 |
| 2006/0249010 A1* | 11/2006 | John | ............... | F41A 19/68 |
| | | | | 89/1.11 |

* cited by examiner

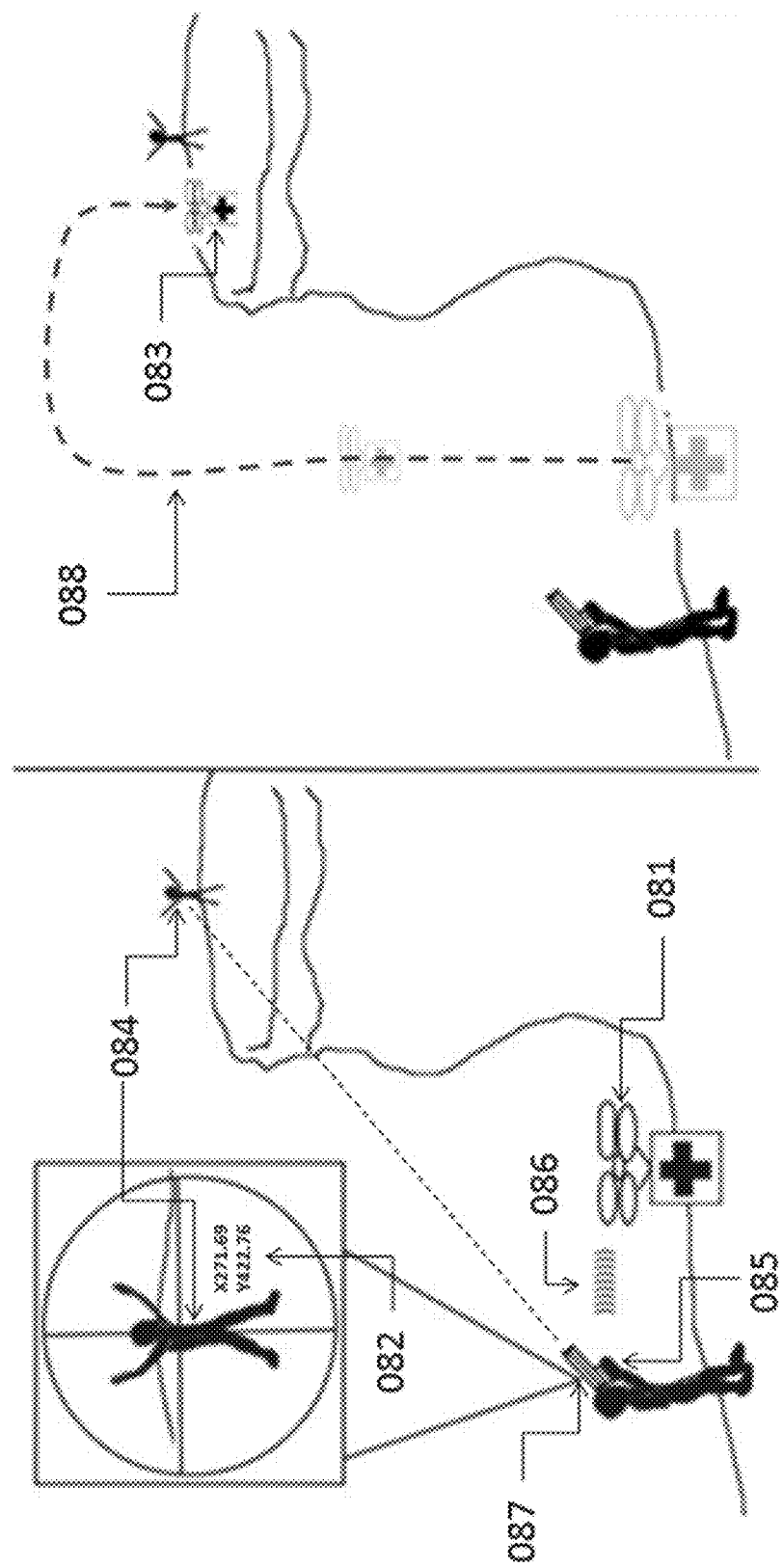

SIGHTING AND LAUNCHING SYSTEM CONFIGURED WITH SMART MUNITIONS

RELATED U.S. APPLICATION DATA

This application is a continuation-in-part of U.S. patent application Ser. No. 13/925,620, filed on Jun. 24, 2013, now U.S. Pat. No. 9,310,165, entitled "PROJECTILE SIGHTING AND LAUNCHING CONTROL SYSTEM", which is a continuation-in-part of U.S. patent application Ser. No. 12/607,822, filed on Oct. 28, 2009, now U.S. Pat. No. 8,468,930, entitled "SCOPE ADJUSTMENT METHOD AND APPARATUS", which is a continuation-in-part of U.S. patent application Ser. No. 11/120,701, filed on May 3, 2005, now U.S. Pat. No. 7,624,528, entitled "SCOPE ADJUSTMENT METHOD AND APPARATUS", which is a continuation-in-part of U.S. patent application Ser. No. 10/441,422, filed on May 19, 2003, now U.S. Pat. No. 6,886,287, entitled "SCOPE ADJUSTMENT METHOD AND APPARATUS", which claims priority from U.S. provisional application Ser. No. 60/381,922, filed on May 18, 2002, each of which is expressly incorporated by reference herein in its entirety.

BACKGROUND

Field of the Disclosure

The present teachings generally relate to unmanned launching systems, precision-guided smart munitions, virtual reality (VR) sighting systems, and methods of the same.

Description of the Related Art

Munitions are typically designed to travel from a point of origin to a point of impact. A common example of a munition's point of origin would be the munition's launching system (aka weapon) which launches a munition such as a projectile or other form of ammunition. A common example of a point of impact would be the shooter's selected visual target or a specific coordinate which defines the location of where the shooter is intending for the munition to hit. Some of the munitions commonly used in law enforcement, homeland-security, and military operations include bullets, mortars, and missiles; whereas some of the commonly used launching systems include rifles, howitzers, grenade launchers and missile launching systems.

Advanced munitions include precision-guided munitions; also known as smart munitions. Such precision-guided munitions (PGMs) are intended to precisely hit a specific target, and to minimize collateral damage. Common examples of smart munitions would be laser-guided missiles and smart bombs.

Many munition launching systems are equipped with portable sighting devices, which aid the shooter in accurately positioning the launching system to a precise point of aim (POA). A common example of a munition launching device having a portable sighting device would be a rifle with a rifle scope. In this example, when shot, the munition's point of impact (POI), relative to the scope's targeted POA, varies depending on various ballistic parameters associated with the munition's specifications and the shooting parameters at hand. Some of the common shooting parameters include, for example, the distance to the target, the wind speed and the wind direction that is present at the time that the projectile is launched.

Virtual reality (VR) devices consist of prior art technologies which integrate immersive multimedia with real-world environments. Such VR devices simulate a physical presence, in real-time, of an actual place in the real world. An example of a VR environment might be a simulated 3-D battlefield of "the real" battlefield which might be located several or even hundreds of miles away. In this example, a VR device may provide a soldier with a 3-D sensory experience such that the soldier can see, hear, touch, smell, and respond to the elements of the battlefield as if he was actually "there" but in reality be in the safe confines of a military installation or underground bunker. Other VR devices may simulate the operations of a specific piece of equipment. For example, a pilot may be able to fly an aerial drone by utilizing a VR device, or a police officer may be able to safely detonate a terrorist's bomb in a VR environment using a robotic apparatus that acts as a simulated extension of the police officer's arms and hands and feet.

Drones are essentially unmanned robots whose prior art technologies allow their users to perform surveillance, mapping, and weapon deployment from a safe and remote location. Drones can be configured for a variety of purposes including aerial drones, terrestrial drones, and marine drones.

In patent application Ser. No. 13/925,620, inventor John C. Bell describes a sighting system for a projectile launching device that comprises a remote controlled robotic apparatus. The automatic reticle adjustment features of application Ser. No. 13/925,620, when coupled with the robotic apparatus, allow the shooter to operate a projectile launching device in a hands-free manner. The remote control feature of the robotic apparatus allows the operator to wirelessly maneuver the vertical, horizontal and rotational movements of the projectile launching device from a remote location. The remote controlled robotic apparatus, remote controlled sighting system, and remote controlled trigger-activation device, can act in combination as a hands-free projectile launching system that can be viewed, controlled, and operated by the shooter from a remote location.

Application Ser. No. 13/925,620 further describes a sighting system for a projectile launching device comprising a controller assembly device configured to automatically adjust the POA of the projectile launching device (in real-time). This automatic adjustment of the POA is performed by retrieving and adjusting the POI coordinate command of its automatic sighting-system. This automatic POA adjustment function integrates commercially available digital target-get-recognition system technologies. The digitally recognized moving target, as deciphered by the target recognition system, becomes the 'locked-on' POA of the moving target, and the POA's corresponding pre-recorded POI coordinate command causes the POA controller assembly to automatically move-in-synch with the re-calibrated hold-over position of the anticipated POI coordinates of the moving target.

Application Ser. No. 13/925,620 further describes a sighting system for a projectile launching device that comprises a cryptically-encoded Ground Positioning System (GPS) device. The GPS device aids fellow sportsmen, law enforcement and/or authorized personnel to locate and monitor the movement and activity of their fellow-comrades from afar. The sighting system further comprises a digital compass such that when a shooter aims at his intended target, the combination of the GPS coordinate of the projectile launching device, the digital compass bearing of the respective POA, and the precise slope-adjusted distance to the intended target (via range finder); can aid authorized personnel to automatically locate the precise Ground Positioning Coordinate (GPC) of the intended target from a remote location. The GPC of the intended target is a processor-induced function of the GPS coordinates of the shooter relative to the slope-corrected distance and compass bearing from the shooter to the intended target. The digital information associated with the shooter's GPS coordinate as well as the GPC of the intended target are automatically transmitted (streamed in real time) to fellow comrades and/or central command center. This targeted GPC can also provide fellow comrades and/or central command with a coordinate of the intended target relative to the other shooter's GPS locations. Fellow comrades and/or central command can use this targeted GPC for the deployment of additional troops, weaponry or trajectory bearings for; example, a mortar division. Bell further describes that his integrated sighting system may be mounted to any hand-held, portable, and/or mobile projectile launching device (such as a mortar launching device) without departing from the spirit of his teachings.

Application Ser. No. 13/925,620 further describes that the GPC/GPS features of Bell's integrated sighting system can also help prevent friendly-fire accidents from occurring because; for example, in the event that one allied soldier aims at another allied soldier, the GPC of the soldier being aimed at can be automatically deciphered by the wireless network-integrated GPC sighting system as being a friendly target. This is because the GPC of the target being aimed at can be automatically compared against the data base all allied GPCs in the field in real-time. In this particular example, application Ser. No. 13/925,620 describes a sighting system that can automatically override the offending soldier's weapon from being fired until such time that the shooter turns his weapon away from the friendly GPS/GPC target coordinate.

Application Ser. No. 13/925,620 further describes a sighting system for a projectile launching device that comprises a remote controlled trigger activation device. The trigger activation device allows the operator to wirelessly activate (fire) the projectile launching device from a remote location.

SUMMARY

The opportunity to augment Bell's prior art with his present teachings and combine them with the prior art of smart munitions, virtual reality (VR) devices, drone technology; will further enhance our country's military, homeland security and law enforcement technologies, and maintain their superior advantage in global and national defense.

In one embodiment, an unmanned sighting and launching system whose source of ammunition consists of a plurality of precision-guided munitions (PGMs). The PGMs may include but is not limited to smart drones. Examples of such smart drones include aerial drones, terrestrial drones, marine drones, and mini missiles. Unlike open-loop navigational systems of laser guidance systems, the navigational system of the present teaching is closed-loop, wherein the PGM cannot be "jammed" or disabled by counter-warfare. The precise target coordinate of the PGM is automatically determined by a portable sighting device as described in Bell's prior teachings. In this present teaching, however, the precise target coordinate is wirelessly transmitted from the portable sighting device to the PGM at which point the PGM is locked-on to the transmitted coordinate. The precise target coordinate is transmitted to the PGM via an encrypted transmission signal; the signal of which automatically engages the PGM to be immediately launched. The PGM is able to automatically launch and "navigate itself" (auto pilot) to the precise coordinate of the shooter's chosen location.

In one embodiment, the precision-guided munitions (PGMs) of the present teaching include drones containing one or more optical assemblies that allow for drone-mapping imagery processing. One example of this configuration would be an optical assembly(s) coupled to one or more aerial drones. Such imagery processing provides the shooter's field of view (FOV) with an immersive 3-D digital display of the target and its surrounding environment. Example technologies of immersive 3-D, panoramas and "synths" include Lidar, Microsoft Image Composite Editor©, and Photosnth 3D©. Such 3-D imagery enables the shooter to accurately assess the target and shooting environment in a three-dimensional and 360 degree perspective. When configured with multiple-drones, the shooter is able to simultaneously view the target from multiple perspectives; enabling the shooter to weigh various options of engagement. In one example, the 3-D FOV can be viewed via a virtual reality (VR) device. Example virtual reality (VR) viewing devices include Oculus Rift© and HoloLens©.

In one embodiment, the precision-guided munition (PGM) of the present teaching is configured to include one or more optical assemblies that allow the field of view (FOV) of the portable sighting device to be augmented with an enhanced digital display of the target and its surrounding environment. Examples of such enhancements include but not limited to optical-zoom capability, night vision, infrared imagery, and thermal imagery. This encrypted digital information can be viewed and operated from a plurality of remote locations using a variety of remote monitoring devices. The dissemination of such digital information to a plurality of allied locations via network link may provide critical communication and information for developing and orchestrating coordinated battle-plans. Such remote monitoring devices may include, but not be limited to portable sighting devices, smart phones, personal computers and/or central command center(s).

In one embodiment, the precision-guided munition (PGM) can be programmed to approach the precise target coordinate in a random non-linear fashion. Such programming eliminates the restrictions associated with projectiles (example, laser guidance rockets) that are confined to linear projections (straight-line from "Point A" to Point "B"). One example of where a PGM approaching a target in a random non-linear fashion would be favorable to a linear approach would be a target that is taking-cover behind an impenetrable object. In this example, the shooter may not be able to successfully engage the target until the target visually reveals itself to the shooter. However, with the present art, the PGM can be programmed and/or controlled to approach the target by travelling above, around, alongside or under whatever obstacle that may be present. In addition, such non-linear PGMs can be configured to enter into buildings, underground bunkers, or air vents.

In one embodiment of the present teaching, the precision-guided munitions (PGMs), can be configured as a plurality of surveillance drones, which can be used for acquiring various forms of intelligence and shooting parameter data. In one example, the surveillance drones can be configured to contain a vast array of digital sensors and instruments that can be operated by the shooter, and are capable of scanning physical structures such as walls and buildings. Such digital information provides an accurate assessment of the structure's composition and density as well as the ability to discern friend or foe targets located behind such physical structures. In addition, such sensors are capable of measuring the precise shooting parameters that are present during the time of target engagement. Examples of such parameter information may include but not limited to target distance, wind speed, wind direction, temperature, humidity, magnification and altitude. Target distance may include the distance from the drone to the target, and/or the target distance from the shooter to the target, and/or the target distance from one or more of a plurality of portable sighting devices to the target. This real-time parameter information allows the reticle position of the shooter's field of view to be automatically adjusted to the precise target coordinate of the target being engaged. In the event that the target is a moving target, such sensors can lock-onto and measure the target speed and target direction which together with the other parameter information allows the reticle position to automatically adjust so that all the shooter has to do is pull the trigger. In another example, the surveillance drones can be configured to also include an optical assembly that can be operated by the shooter to gather visual imagery in real time from a remote location. Such optical technologies may include but not be limited to Lidar, 3-D immersion; as well as variable zoom-magnification, night-vision, infra-red, and thermal imagery systems.

In one embodiment of the present teaching, the field of view (FOV) and the point of aim indicator (reticle position) of the portable sighting device is calibrated to operate in-synch with and automatically adjust to the digital information that is transmitted from the optical assembly(s) and digital sensors of the precision-guided munition (PGM). In one example, with the aid of various virtual reality (VR) devices, the shooter can simply maneuver his launching system so that the reticle position of the portable sighting device is aligned with the target, at which point the shooter may choose to engage the target by activating the launching system via a VR activation device. In this example, the launching system can be operated in an unmanned configuration and operated by the shooter from a remote location.

In one embodiment, the precision-guided munition (PGM) can be configured to act as a launching system for a variety of weapon delivery systems. Such weapons delivery systems may include, but not be limited to smart explosives, wherein the PGM explodes upon arriving at the precise target coordinate. Other weapon delivery systems of this embodiment may include but not be limited to smart bombs, non-lethal chemical propellants (example tear gas or sleeping gas), incendiary materials, and concussive weaponry.

In one embodiment of the present system, the precision-guided munition (PGM) can be configured to transport an optical assembly, an array of sensors, and an unmanned projectile launching system. One example of an unmanned projectile launching system might include a fully-automatic machine gun(s) or grenade-launcher(s). In this example, the sensors capture the parameters of the shooting environment while the optical assembly acts as an extension of the portable sighting device whose field of view (FOV) can be viewed by the shooter from a remote location. The optical assembly provides the shooter with a clear field of view (FOV) of the target and its surrounding environment. The digital sensors wirelessly transmit the precise shooting parameter information to the portable sighting device such that the point of aim indicator (reticle position) of the portable sighting device automatically adjusts to the precise point of impact coordinate of where the projectile will hit. Under this configuration, the shooter may choose to utilize virtual reality (VR) technologies; wherein the shooter simply maneuvers his VR field of view (using a VR device at a remote location) such that the reticle position of the FOV is placed on his desired target. Once the reticle position of the FOV is placed on the target, the shooter can engage the target at his own discretion (using a VR trigger-activation device).

In one embodiment, the precision-guided munition (PGM) can be configured to include one or more of a variety of aid-delivery platforms that can be used to support allied individuals or civilian casualties. Such aid-delivery platforms may include, but not be limited to the delivery of food and water, ammunition delivery, first aid delivery, delivery of covert information and delivery of miscellaneous supplies. Wherein the shooter simply aims at the location of where he wants to deliver the aid supplies and then engages the trigger-activation device; wherein the PGM is automatically launched (via closed-loop navigation) to the desired delivery coordinate.

BRIEF DESCRIPTIONS OF THE DRAWINGS

FIG. 8 illustrates how the unmanned sighting and launching system can also be used for the deployment and delivery of aid to allied troops and victims of casualty.

DETAILED DESCRIPTION OF CERTAIN EMBODIMENTS

Figure 1:
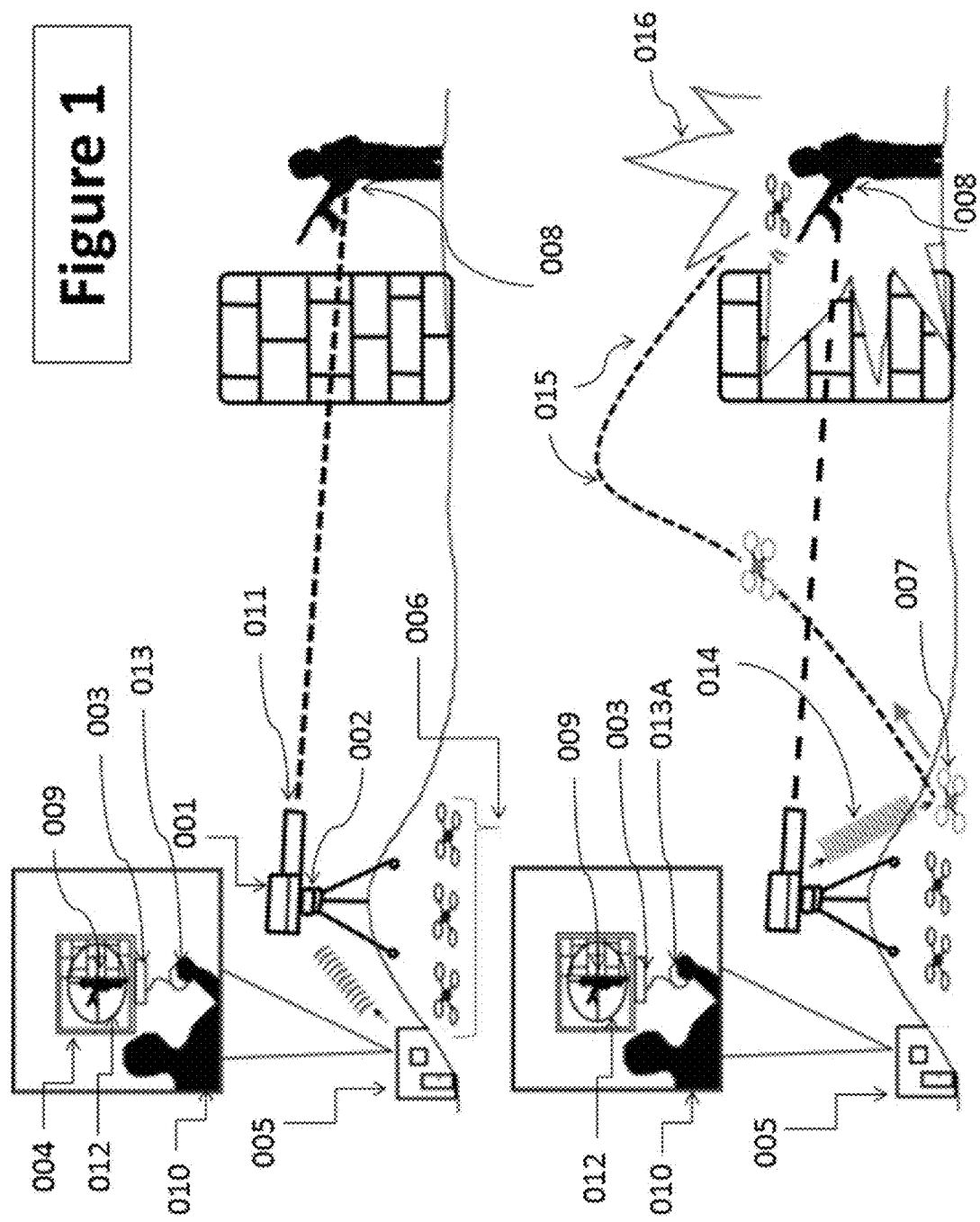
FIG. 1 illustrates an unmanned sighting and launching system with a plurality of aerial smart drones and a target that is visible to the shooter.

FIG. 1 illustrates an unmanned sighting and launching system consisting of a portable sighting device (001) coupled to a gimbaled robotic platform (002), a user-controlled device such as a personal computer (003) that displays and controls the field of view (004) of the portable sighting device from a remote location (005); and a plurality of aerial smart drones (006) each of which act as a precision-guided munition (PGM) that can be launched from a point of origin (007) to a precise target coordinate (008). In this illustration the drones act as a smart bomb munition, which is configured to immediately explode (016) when arriving within close-proximity to the precise target coordinate (008). The portable sighting device (001) allows the shooter (010) to safely view his targets from a remote location (005). The portable sighting device in this illustration consists of a powerful telescopic optical assembly (011) which allows the shooter to zoom-in on a target while the gimbaled robotic platform (002) allows the shooter to maneuver his field of view (004) in a 360 degree fashion from a hand held device such as a smart phone or personal computer (003). In this example, the shooter's field of view (004) includes an auto-adjusting reticle (012), wherein the reticle is calibrated to automatically adjust to a precise target coordinate (008) relative to the target distance and the ever-changing field parameters as they occur in real-time. In this configuration, the shooter manipulates his field of view (FOV) using a computer mouse (013) such that the self-adjusting reticle position is placed squarely on the target (009). Once the reticle is placed on the target, the reticle automatically becomes locked-on to the target so that in the event the target was to move, the reticle will automatically stay centered on the target. Once the reticle locks-on, at the shooter's discretion he can choose to launch one or more of his smart drones by simply "clicking" his mouse (013A). Clicking the mouse instructs the portable sighting device to transmit an encrypted signal (014) of the precise target coordinate (008) to the drones for immediate launch and closed-loop navigation. Once launched, the smart drone quickly navigates itself in a non-linear pattern (015) to the target and explodes when it comes into close proximity to the coordinate (016).

Figure 2:
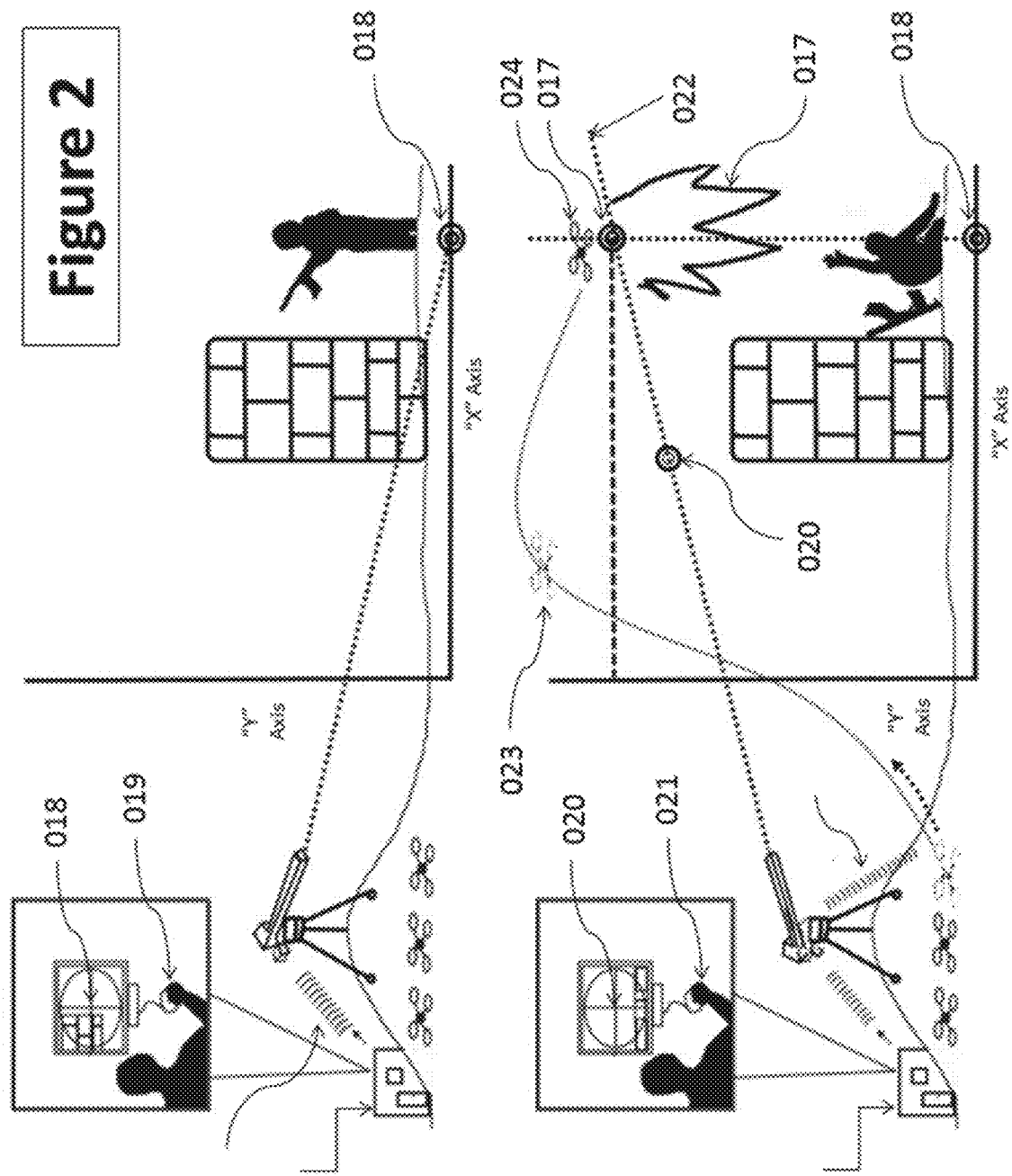
FIG. 2 illustrates an unmanned sighting and launching system with a plurality of aerial smart drones and a target that is hiding behind a wall.

FIG. 2 illustrates a similar configuration of an unmanned sighting and launching system as FIG. 1, but in this example the target is hiding behind a wall and the shooter is unable to obtain a precise target coordinate in the same way as in FIG. 1. In situations where the target is hiding, the shooter is still able to engage the target by deploying his drone to a customized off-set coordinate position. These off-set coordinate positions may be located above, or to the side, or even below the hidden target. In this illustration, the shooter quickly creates his off-set coordinate position (017) by first aiming on the ground to the right of the wall and in-line with where the shooter believes the target is hiding (018). Aiming to the right of where the target is hiding provides the aiming device with the approximate target distance, which we will call our "x" coordinate. In one example, the "x" coordinate can be established by simply right-clicking the PC's mouse (019). Once the shooter has established the "x" coordinate, the shooter then maneuvers his field of view and reticle position to a point located just above the wall where he believes the target is located (020), at which point he right-clicks his mouse once again (021). Right-clicking the mouse a second time establishes the bearing and line of flight to the target (022). We will call this second coordinate our "y" coordinate. Now that both the "x" and "y" coordinates have been obtained, the shooter can deploy his drone to the target by simply left-clicking his PC's mouse. Once deployed, the drone will travel (via closed-loop navigation) in a non-linear fashion (023) until it converges at the "x' and "y" coordinates (024). Once the drone arrives at the convergence of the "x" and "y" coordinates, it automatically explodes (025).

Figure 3:
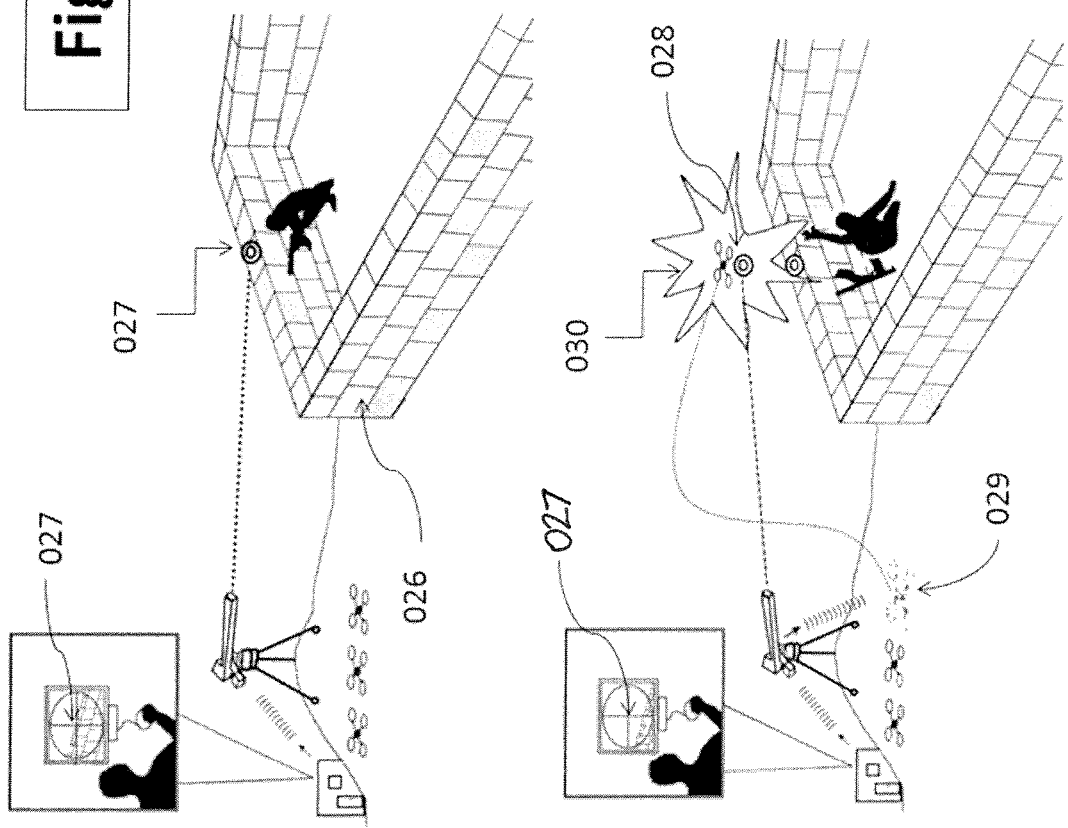
FIG. 3 illustrates an unmanned sighting and launching system with a plurality of aerial smart drones and a target that is hiding in a bunker.

FIG. 3 illustrates another example of a customized off-set coordinate position, but in this example the target is hiding in a bunker (026). In this illustration, the shooter establishes his customized off-set coordinate by first aiming at the front edge of the bunker, which in-turn establishes the "x" coordinate (027). Next he establishes the "y" coordinate by simply aiming at a point located just above the top of the bunker (028). The shooter then deploys his drone (029), which automatically explodes upon arrival of the convergence of the "x and y" coordinates (030).

Figure 4:
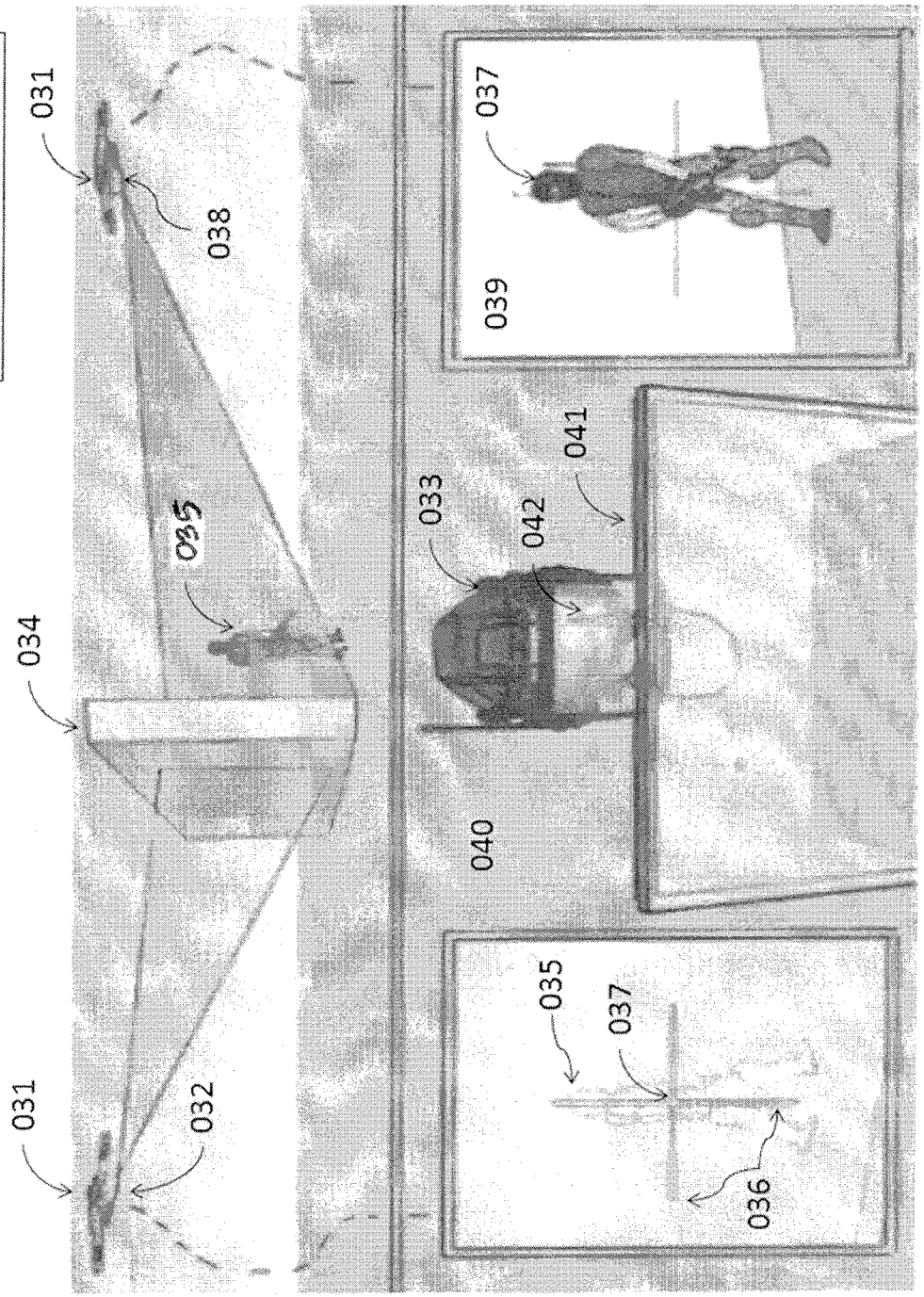
FIG. 4 illustrates an aerial drone with sensors that are capable of scanning a solid structure and identifying enemy targets that are hiding behind such structures.

FIG. 4 illustrates a plurality of aerial drones configured to act as surveillance drones (031). Surveillance drones can be used for acquiring various forms of visual and shooting-parameter information. In one example, the surveillance drones can be configured to contain a vast array of digital sensors and instruments (032), which can be operated by the shooter (033), and are capable of scanning physical structures such as walls and buildings (034). Such digital information provides an accurate assessment of the structure's composition and density as well as the ability to discern friend or foe targets (035) located behind such physical barriers and structures. In addition, such sensors are capable of measuring the precise shooting parameters that are present during the time of target engagement. Examples of such parameter information may include but not limited to target distance, wind speed, wind direction, temperature, humidity, magnification and altitude. Target distance may include the distance from the drone to the target, and/or the target distance from the shooter to the target, and/or the target distance from one or more of a plurality of portable sighting devices to the target. This real-time parameter information allows the reticle position (036) of the shooter's field of view to be automatically adjusted to the precise target coordinate (037) of the target engaged (035). In the event that the target is a moving target, such sensors can lock-onto and measure the target speed and target direction which together with the other parameter information allows the reticle position to automatically adjust so that all the shooter has to do is activate the trigger-activation device. Examples of trigger-activation devices may include but not be limited to computer key, mouse-click, touch screen, virtual reality (VR) trigger etc. In another example, the surveillance drones can be configured to also include an optical assembly (038) that can be operated by the shooter (033) to gather visual imagery (039) in real time from a remote location (040). Such visual imagery may be viewed using a variety of different display devices; including but not limited to personal computers (041), smart phones, optical head-mounted display (042), and virtual reality devices. The data and optical-gathering technologies used may include but not be limited to Lidar, sonar, ultra-sound, 3-D immersion; as well as variable zoom-magnification, night-vision, infra-red, and thermal imagery systems.

Figure 5:
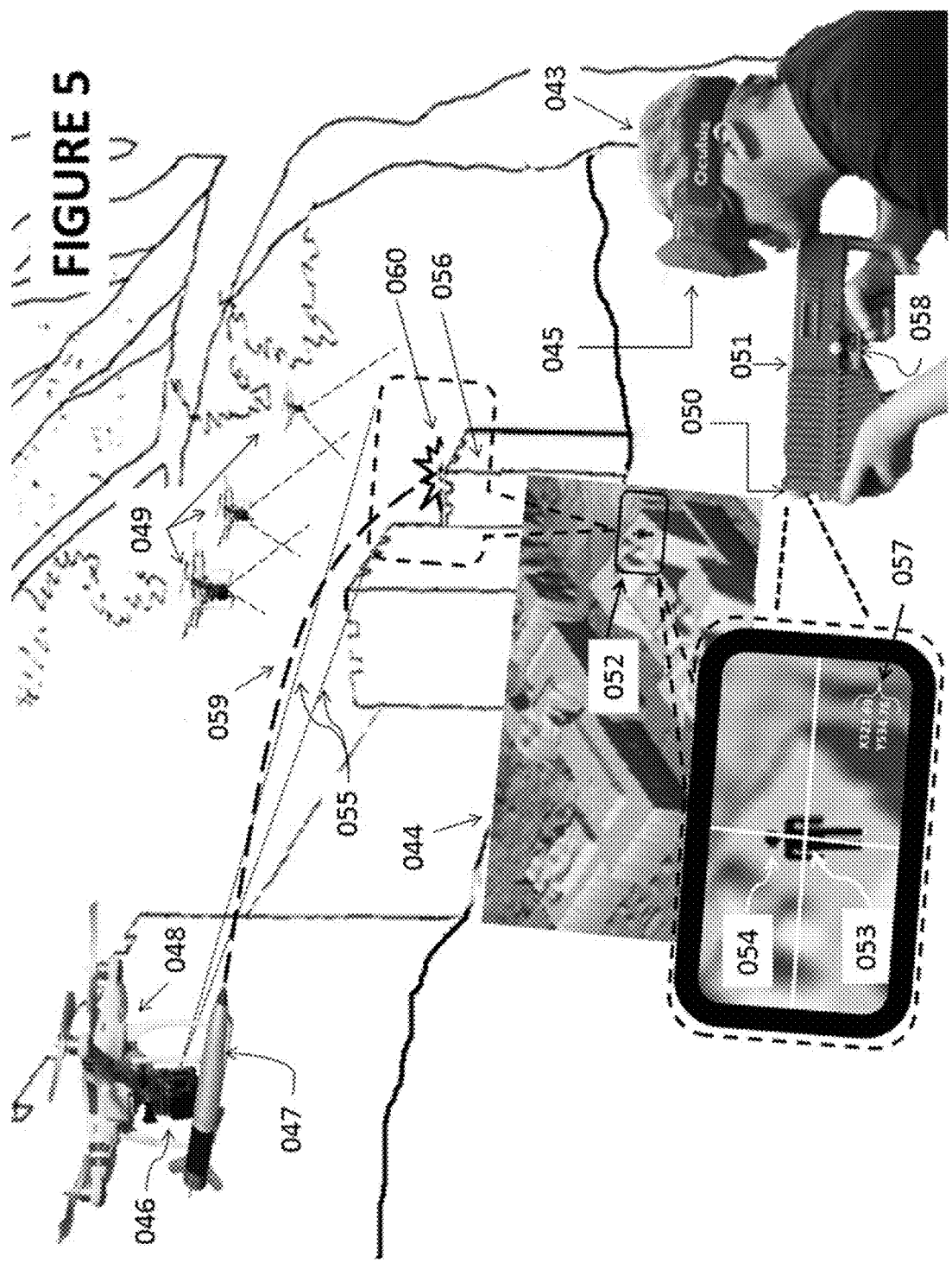
FIG. 5 illustrates surveillance drones providing a shooter with 3-D mapping and virtual reality (VR) information in real time and his ability to deploy mini missiles accordingly.

FIG. 5 illustrates a shooter (043) viewing a 3-D display of the target and surrounding environment (044) via a virtual reality (VR) viewing device (045). In this example the sighting and launching system consists of an optical assembly (046) and mini-missile launcher (047) coupled to an aerial sighting-drone (048). In addition, the sighting and launching system consists of one or more surveillance drones (049); and a virtual reality (VR) scope (050) coupled to a virtual reality (VR) rifle (051). In this configuration, the surveillance drones provide the shooter's VR viewing device with 3-D imagery, in real time, of the surrounding landscape. The optical assembly on the sighting-drone provides the shooter with a point of aim indicator (reticle) that acts as a movable reticle cursor (052) that is superimposed over the 3-D landscape. The movable reticle cursor can be controlled by the shooter independent of the 3-D landscape imagery. The reticle cursor operates in-synch with the VR rifle and the VR scope, allowing the shooter to simply maneuver his VR rifle so that the VR scope's reticle position (053), as displayed in the shooter's VR viewing device (045), is placed on the enemy target (054) as viewed from the optical assembly (055). FIG. 5 illustrates that even though the enemy target has taken cover behind an impenetrable wall (056) and cannot be seen from where the shooter is standing; the surveillance drones allow the shooter to view the target in 3-D and from multiple perspectives. The combination of surveillance drones and sighting drone with the movable reticle cursor enables the shooter to view a target from multiple perspectives and then automatically obtain a precise target coordinate (057) to which one or more precision-guided munitions (PGMs) can be deployed to. Once the shooter places the reticle position (053) on the target (054), the shooter can engage the target by engaging the trigger activation device (058) on the VR rifle. Once the trigger is engaged, the precise coordinate of the target is cryptically transmitted to one or more of the mini-missiles (047) which are launched and auto-piloted (closed-loop navigation) in a non-linear fashion (059) to the precise target coordinate. In this example, an aerial drone launches one or more mini-missiles from the drone to the precise target coordinate whereupon it explodes (060).

Figure 6:
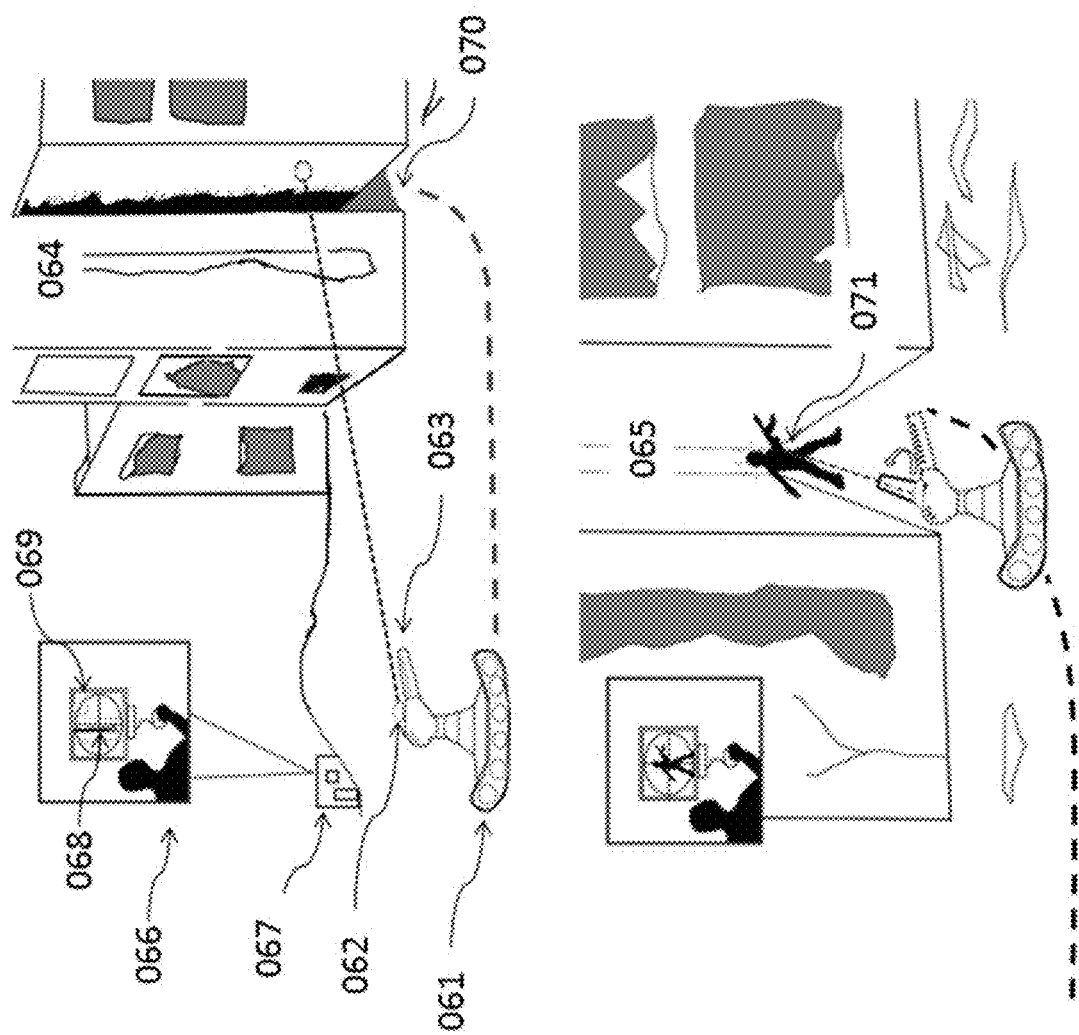
FIG. 6 illustrates a terrestrial drone with an optical assembly and projectile launching device being dispatched to a precise target coordinate adjacent to a confined space and then being manually operated by the shooter.

FIG. 6 illustrates a sighting and launching system configured to include one or more terrestrial drones (061) that contains a sighting system (062) and projectile launching device (063) that can be used to engage enemy targets in a quick and concise fashion. The terrestrial drones can be deployed into buildings (064) or confined areas (065) that may be otherwise inaccessible by aerial drones. In this example, the sighting system consists of an optical assembly that allows the shooter (066) to operate the terrestrial drone from a remote location (067). The shooter can enable the drone to automatically navigate (via closed-loop auto-pilot) to a precise coordinate location by placing the reticle position (068) of the drone's field of view (069) at the point in which the shooter wants the drone to quickly travel to (070). Once the drone arrives at the selected coordinate location, the shooter can then manually take-over controlling the drone via encrypted remote controls and engage the enemy target (071) with projectile weaponry in a quick and efficient manner.

Figure 7:
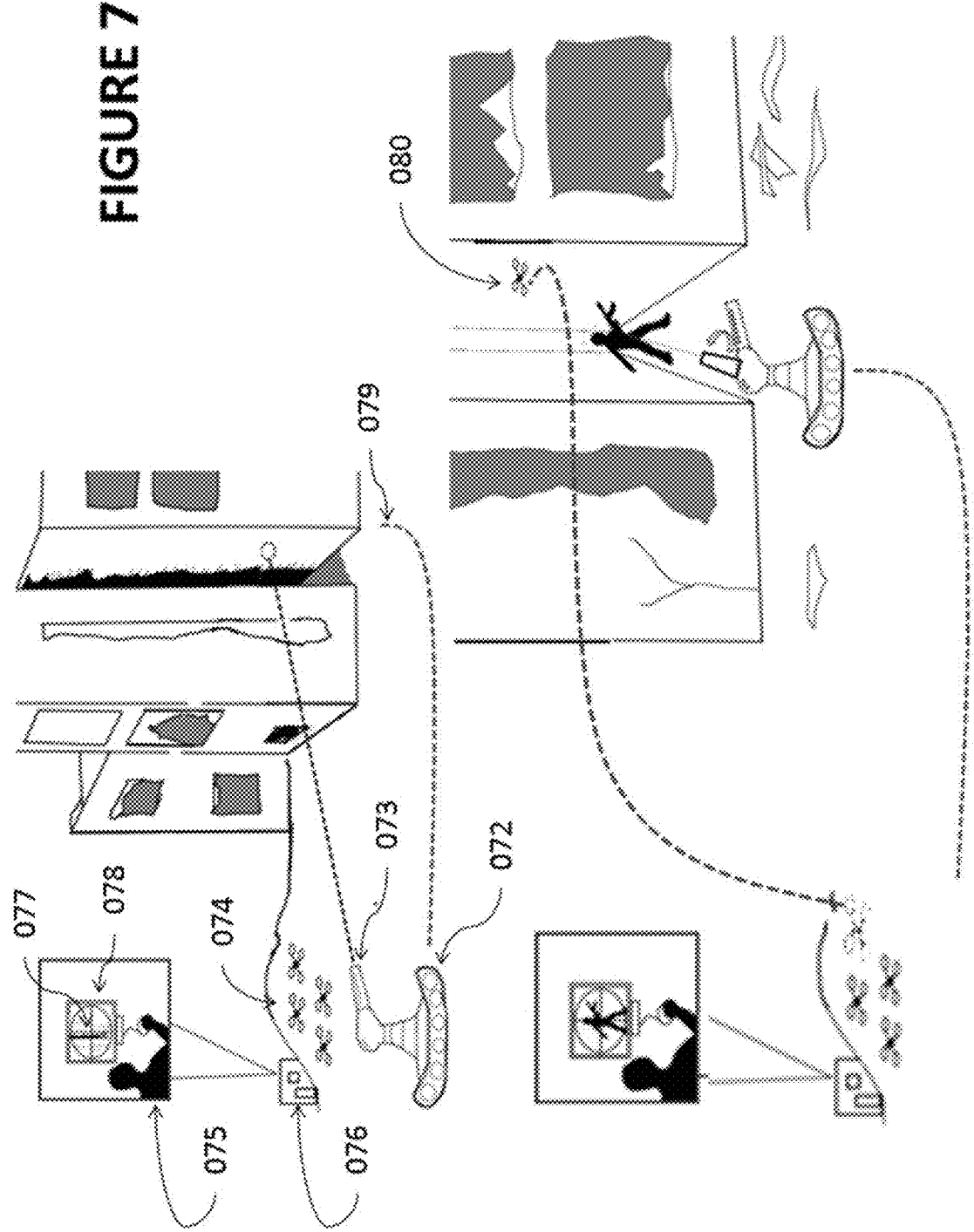
FIG. 7 illustrates a terrestrial drone with an optical assembly being dispatched to a precise target coordinate adjacent to a confined space; enabling the shooter to dispatch an aerial drone with an explosive device to a precise target coordinate that is located within the confined space.

FIG. 7 illustrates a sighting and launching system configured to include one or more terrestrial drones (072) that contains a sighting system (073) and a plurality of aerial drone munitions (074) that can be used to engage enemy targets in a quick and concise fashion. The terrestrial drones can be deployed to peek around walls or into buildings; enabling the shooter to obtain a precise target coordinate that may be otherwise unobtainable with a stationary sighting system (refer to FIGS. 1-3). In this example, the terrestrial drone consists of an optical assembly that allows the shooter (075) to operate the terrestrial drone from a remote location (076). The shooter can enable the drone to automatically navigate (via closed-loop auto-pilot) to a precise coordinate location by placing the reticle position (077) of the drone's field of view (078) at the point in which the shooter wants the drone to quickly travel to (079). Once the drone arrives at the selected coordinate location, the shooter can then manually take-over controlling the drone via encrypted remote controls and engage the enemy target (080) by dispatching an aerial drone munition to the target.

FIG. 8 illustrates a sighting and launching system configured to include one or more of a variety of aid-delivery systems that can be used to support allied individuals or civilian casualties. In this example an aerial drone (081) is configured to act as a transport and delivery system wherein the drone is programmed to travel to a precise target coordinate (082) at which point the drone can land the supplies in a controlled fashion (083). Such aid-delivery systems may include, but not be limited to food and water delivery, ammunition delivery, first aid delivery, delivery of covert information and delivery of miscellaneous supplies. Wherein the dispatcher simply aims his portable aiming device at the location of where he wants to deliver the supplies (084) aid pulls the trigger (085). The precise target coordinate of where the drone is to deliver the aid is transmitted (086) from the portable sighting device (087) to the aid-delivery drone (081) at which point the drone is automatically navigated (closed loop) in a non-linear fashion (068) to the desired delivery coordinate (063).

What is claimed is:

1. An unmanned wireless-controlled sighting and launching system, the system comprising:
   a plurality of optical assemblies, sensors, and network links that allows the system to identify friendly targets from foe targets and thus allowing a plurality of operators to view a plurality of targets in a surrounding shooting environment from multiple perspectives from a plurality of remote locations;
   a wirelessly-adjustable point of aim indicator device that defines a point of aim of each operator of the plurality of operators as well as the coordinate location of each operator's selected target; and
   a plurality of platforms that can be wirelessly dispatched by each of the plurality of operators to the coordinate locations of the selected targets, in an orchestrated fashion; wherein the optical assemblies, when coupled to at least one of the plurality of platforms, allow for 3-D mapping imagery processing in real-time,
   wherein the mapping imagery allows at least one of the plurality of operators to view the target(s) relative to the shooting environment that is surrounding the target(s) using an immersive 3-D digital display, wherein such 3-D imagery enables the operator to accurately survey the shooting environment in real-time and engage a selected target in a three-dimensional and 360-degree perspective.

2. The system of claim 1, wherein the optical assemblies may be coupled to the plurality of platforms; whereby both the optical assemblies and the platforms can be dispatched, viewed and controlled by the plurality of operators from the plurality of remote locations.

3. The system of claim 1, wherein the optical assemblies enable the operator to view and engage the target(s) or the surrounding shooting environment using optical-zoom, night vision, infrared imagery, and thermal imagery capabilities.

4. The system of claim 1, wherein the optical assembly is calibrated to operate in-synch with the point of aim indicator which is viewed and maneuvered by the operator from said remote location.

5. The system of claim 1, wherein the optical assemblies and network link, when coupled to the plurality of platforms, allows at least one of the plurality of operators to view and engage the targets from a virtual reality (VR) environment using a combination of VR viewing devices, VR aiming devices including point of aim indicators and VR trigger-activation devices in a coordinated fashion.

6. The system of claim 1, wherein the platforms can be configured as said plurality of smart munitions, wherein each operator may dispatch a plurality of smart munitions to a plurality of targets by placing the point of aim indicator on the target(s) and engaging the launching system from said remote location(s).

7. The system of claim 1, wherein the plurality of sensors is capable of scanning physical structures such as walls and buildings in an effort to determine whether or not the structure's composition and density is penetrable when selecting from the plurality of smart munitions that may be readily available and dispatch-able from a plurality of said locations.

8. The system of claim 1, wherein the pluralities of sensors, optical assemblies, and network link allows said plurality of operators to participate in target identification and coordinated engagement in real time from said remote locations; wherein such capabilities automatically enable the system to determine whether or not the intended target is a friend or foe and in the event the target is friendly, provide automatic safety over-ride.

9. The system of claim 1, wherein said plurality of sensors are capable of locking-onto and measuring a shooting-parameter information of moving targets, allowing the point of aim indicator to automatically adjust to the moving target such that the operator can engage the target without having to manually track the target.

10. The system of claim 1, wherein a precise target coordinate(s) of the shooter's point of aim, as selected by the operator, enables at least one of a plurality of smart munitions to automatically navigate to a precise coordinate of the target in a random non-linear fashion.

11. The system of claim 1, wherein a precise target coordinate of the shooter's point of aim, can be strategically offset by the operator using the plurality of platforms so as to enable him to navigate his smart munition around, behind, or into an otherwise visibly-restrictive and/or impenetrable barrier.

12. The system of claim 1, wherein at least one of a plurality of smart munitions can be programmed and/or manually remote-controlled to approach the target by travelling above, around, alongside or under whatever obstacle that may be present.

13. The system of claim 1, wherein at least one of a plurality of smart munitions is configured to act as a launching system for a variety of weapon delivery systems; wherein such weapons delivery systems may include, but not be limited to smart explosives or drones; wherein the drone automatically explodes immediately upon arriving at a precise target coordinate.

14. The system of claim 1, wherein at least one of a plurality of smart munition can transport an optical assembly, an array of sensors, and an unmanned projectile launching system; wherein the array of sensors captures a plurality of parameters of a shooting environment while the optical assembly and projectile launching system can be viewed and operated by a plurality of shooter(s) from said remote location(s).

15. The system of claim 1, wherein at least one of a plurality of smart munitions acts as an aid-delivery platform that delivers aid; wherein at least one of a plurality of shooter(s) aims at said location(s) of where he wants said aid delivered, and then activates a launching system; wherein said aid-delivery platform is automatically launched to a desired delivery coordinate whereupon said at least one of the plurality of shooter(s) safely lands and delivers said aid; wherein said aid delivery-platform can be automatically retrieved upon successful delivery of said aid.

* * * * *